United States Patent [19]

Morlock

[11] Patent Number: 5,882,072
[45] Date of Patent: Mar. 16, 1999

[54] REDUCED HEAD IMPACT SEAT SYSTEM

[75] Inventor: Wade T. Morlock, Marysville, Wash.

[73] Assignee: The Boeing Company, Seattle, Wash.

[21] Appl. No.: 767,171

[22] Filed: Dec. 16, 1996

[51] Int. Cl.⁶ ........................................................ B60N 2/42
[52] U.S. Cl. ................................ 297/216.13; 297/216.1; 297/DIG. 6
[58] Field of Search ...................... 297/DIG. 6, 216.11, 297/216.13, 216.14, 378.1, 354.12, 440.1, 452.48, 452.55, 452.29, 452.31

[56] References Cited

U.S. PATENT DOCUMENTS

| 3,563,599 | 2/1971 | Heumann | 297/440.1 X |
|---|---|---|---|
| 3,837,422 | 9/1974 | Schlanger | 297/216.1 X |
| 3,961,805 | 6/1976 | Satzinger | 297/216.13 X |
| 4,040,660 | 8/1977 | Barecki | 297/216.13 |
| 4,511,178 | 4/1985 | Brennan | 297/440.1 X |
| 4,784,352 | 11/1988 | Smith et al. | 297/216.13 X |
| 5,468,045 | 11/1995 | Weber | 297/216.13 X |

FOREIGN PATENT DOCUMENTS 2083347  3/1982  United Kingdom ................ 297/216.1

Primary Examiner—Milton Nelson, Jr.
Attorney, Agent, or Firm—Mary Y. Redman

[57] ABSTRACT

A passenger seat for reducing head impact in sudden impact events in an aircraft includes a panel for absorbing head impact. The panel is detachably fastened to the rear surface of a seat back so that the seat back will break free of the panel and be thrown forward while the panel will remain in an upright position. The panel is preferably made of a low mass material to absorb momentum of the head of a passenger seated behind it. The panel can be fashioned as a "dummy" seat back, detachably fastened to a seat back by hook and loop fasteners. It can be fabricated to aesthetically blend with the styling of the seat back.

7 Claims, 2 Drawing Sheets

REDUCED HEAD IMPACT SEAT SYSTEM

BACKGROUND OF THE INVENTION

1. Field of the Invention

The present invention relates to seat assemblies for vehicles such as commercial airplanes.

2. Background Information

Minimizing the possibility of head injuries to commercial aircraft passengers in the event of an emergency is of great concern for obvious safety reasons. In commercial aircraft, where passengers are seated one behind the other, there is a potential for a passenger's head to strike the seat in front of him in a sudden deceleration event. United States Government regulations concerned with passenger safety define a Head Impact Criterion (HIC) as follows:

$$HIC = \left\{ (t_2 - t_1) \left[ (t_2 - t_1)^{-1} \int_{t_1}^{t_2} a(t) dt \right]^{2.5} \right\} max$$

where $t_1$ and $t_2$=any two points in time during the head impact, in seconds, and $a(t)$=the resultant head acceleration during the head impact, in multiples of g's.

Lower HIC values correspond to a lower severity of head impact. Current regulations call for HIC values of less than 1000 for commercial airline seats where a passenger head could contact a seat back in the preceding row.

The HIC formula reflects the fact that a very sudden deceleration of the head would have a greater adverse effect than a deceleration of the head which occurs over an increased period of time. The HIC value could be reduced by reducing peak acceleration of the head. A constant or more controlled deceleration of the head after it first contacts the seat back would be preferred to reduce HIC.

While the chance of head injury for passengers could be reduced by increasing the distance between the seats, this would also significantly reduce the amount of floor space available for seating and therefore have a significant adverse economic impact on commercial air travel.

What is needed is a seating system which reliably reduces HIC value and head impact in sudden impact events so as to prevent or minimize head injuries. Such a reduced HIC seat should ideally have little effect on aircraft interiors, cause no reduction in seating density, and preferably involve passive technology needing no triggering devices. The features which contribute to reduction in HIC value should be imperceptible to the passenger during normal operation, so as not to affect his or her comfort.

The present invention is a seat assembly for commercial aircraft or other vehicles with row seating. It has features that reduce the force of head impact in high impact, rapid deceleration events such as collisions. In a preferred embodiment, it has a commercially practical and inexpensive design, and is simple, rugged, and reliable in operation.

SUMMARY OF THE INVENTION

The invention provides an apparatus for reducing head impact in the event of a sudden impact or deceleration of an aircraft. It is particularly well suited for use on commercial aircraft, where Government regulations impose strict requirements to reduce head impact injuries for the safety of the traveling public, and where weight and row spacing considerations can have a considerable impact on flight revenue and cost.

In a preferred embodiment, a panel is detachably fastened to the rear surface of a seat back in such a manner that, in case of a sudden deceleration, the seat back will break free of the panel and be thrown forward while the panel will remain in position. Where the seat back was in the upright position prior to the sudden impact event, the panel will remain in the upright position. A passenger sitting in the row immediately behind who is thrown forward will contact the panel instead of the seat back. The panel is preferably made of a low mass material so that it will absorb some of the momentum of the head of a passenger which contacts the panel. This will reduce peak deceleration of the head and cause the head's deceleration to be spread over a greater period of time than would otherwise be the case. The mass and rigidity of the panel can be chosen according to the amount of momentum transfer desired. In the case of commercial aircraft, this parameter is determined by Government regulations defining HIC, and by what is required for public safety.

The panel can be fashioned as a "dummy" seat back, detachably fastened to a seat back by hook and loop fasteners (such as those sold under the trademark VELCRO*) or snaps. It can be fabricated to aesthetically blend with the styling of the seat back, and can be made of lightweight material. In a commercial airplane, it can reduce head impact without necessitating an increase in row spacing. This is a vitally important consideration in commercial airliners.

DETAILED DESCRIPTION OF THE DRAWINGS

Figure 1:
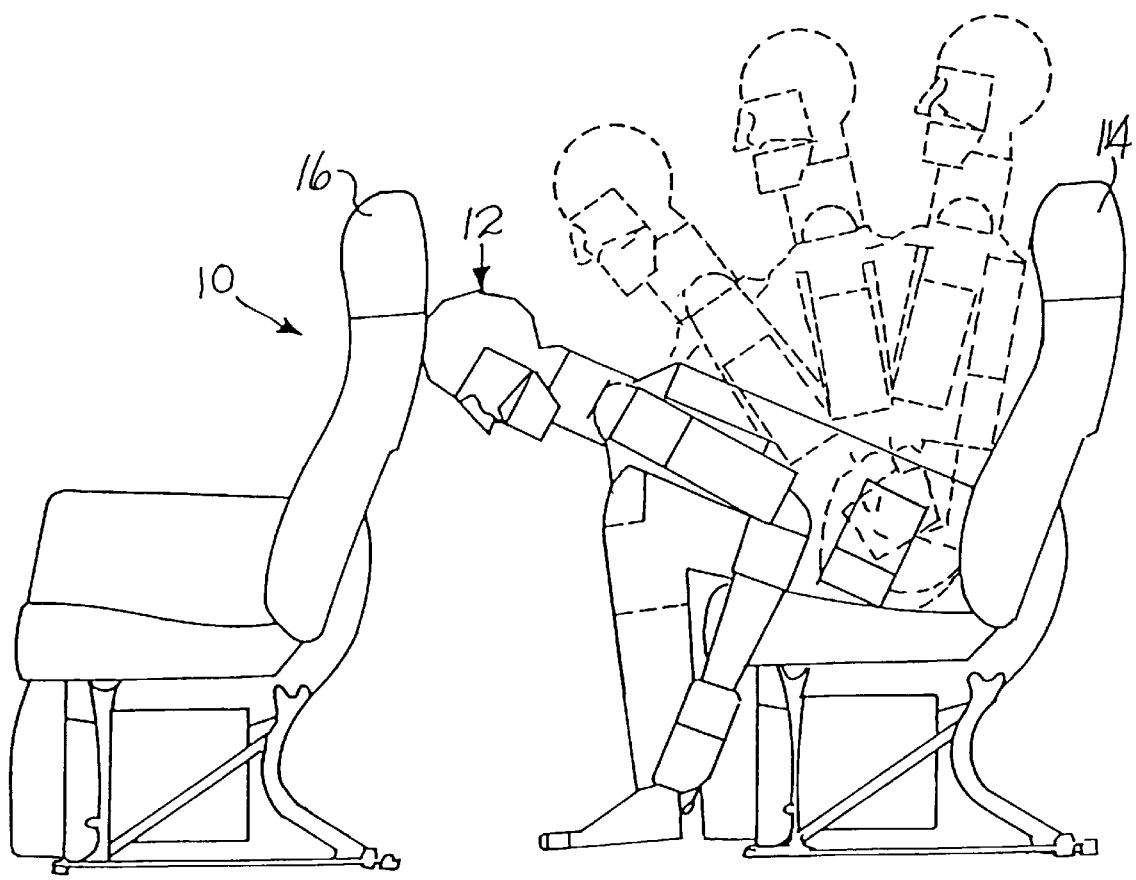
FIG. 1 shows a schematic representation of a typical prior art seat assembly with a passenger in a rearward row thrown forward, as in a sudden deceleration event.

FIG. 1 shows a typical prior art seat assembly 10 in a commercial aircraft. Throughout this description, the forward direction is defined as that direction in which a seated passenger faces. In the event of a collision or other sudden deceleration of the aircraft, a passenger 12 in an adjacent rearward seat 14 could be thrown forward to such an extent that the passenger's head contacts the seat back 16. The mass and rigidity of a typical prior art seat back 16 can result in a very sudden deceleration of the passenger's head. This yields a high HIC value.

Figure 2:
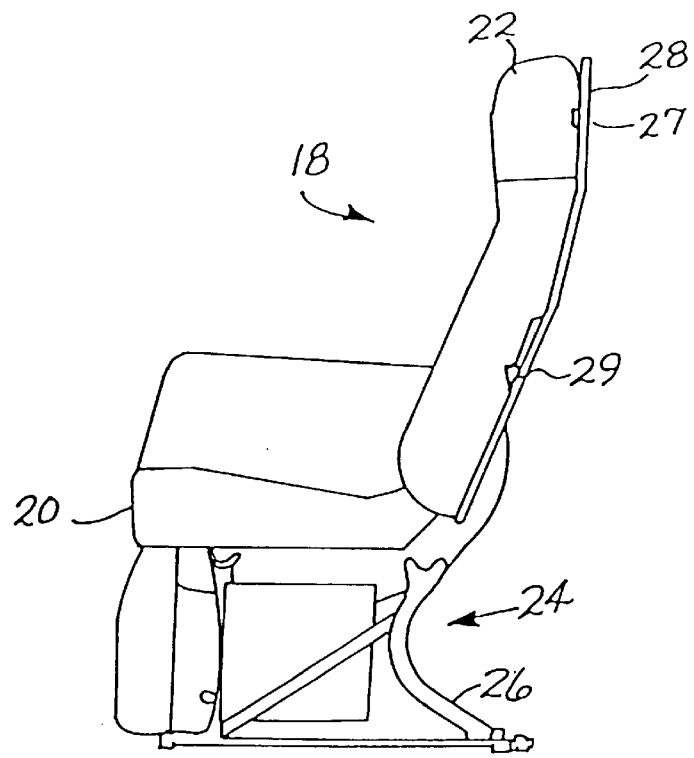
FIG. 2 is a schematic side view of a seat assembly according to a preferred embodiment of the invention.

FIG. 2 shows a preferred embodiment of the invention suitable for use on a commercial aircraft. In the drawing, the arm rest closest to the viewer has been removed for illustrative purposes. The seat assembly 18 includes a seat pan 20 and a seat back 22 mounted on a support frame 24. The frame 24 has legs 26 which are fastened to the floor to hold the seat assembly 18 stationary relative to the floor. The seat back 22 is pivotally moveable relative to the seat pan 20. The seat back can be rotated rearwardly to recline for passenger comfort, and is mounted to rotate forward in case of a sudden impact of sufficient force. The magnitude of this predetermined load is chosen according to safety requirements and applicable safety regulations. The seat back 22 is mounted by conventional means well known in the art.

In the preferred embodiment, a panel 28 forming a "dummy seat back" is detachably mounted to the seat back 22. The panel 28 is preferably shaped so as to aesthetically conform to the contours of the seat back. It can include an opening to accommodate a tray table assembly on the seat back 22. The panel 28 is preferably mounted to the seat back 22 with hook and loop fasteners 27, snaps or the like chosen for a mounting strength that will hold the panel 28 in place against the seat back 22 for all routine movement of the seat back 22 (reclining, for example), but which will allow the seat back 22 to break away from the panel 28 if the seat back 22 rotates forward relative to the seat pan. Stops 29 on the panel 28 (see FIG. 3) are provided to restrain the panel 28 from traveling forward with the seat back 22 in such an instance. In the embodiment shown, the stop 29 is an integral block extending from a side of panel 28 which abuts a portion of the frame 24 near the arm rest 34 when the seat back is in the upright position. Blocks would preferably be provided on both sides of the panel 28. It will be readily appreciated that any one of a variety of stop mechanisms could be implemented either on the panel, or on the seat assembly, by those with skill in the art and all such mechanisms would be within the scope of the invention.

Figure 3:
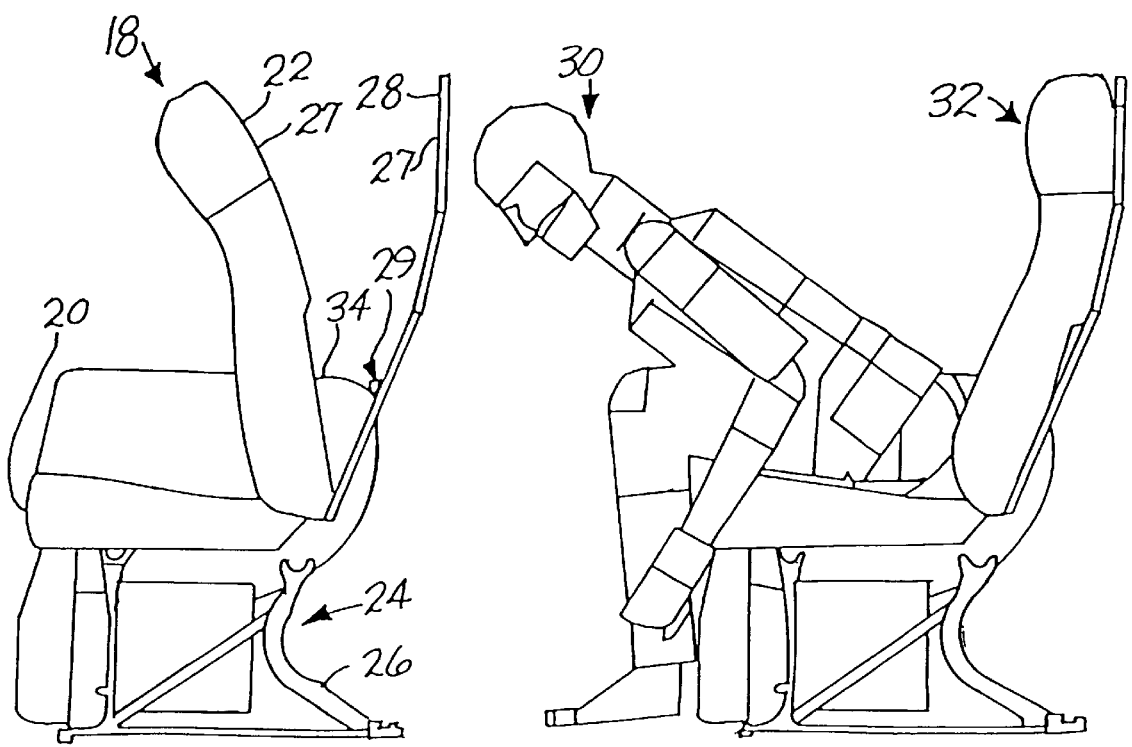
FIG. 3 is a schematic side view of a seat assembly according to a preferred embodiment of the invention in a sudden impact configuration.

FIG. 3 shows the seat assembly 18 of the preferred embodiment deployed in a sudden impact event (a sudden stoppage of the vehicle, for example) which is of sufficient force to cause a passenger 30 in a rearward seat 32 to be thrown forward. The representation of FIG. 3 assumes that the seat assembly 18 was originally in the position routinely used on commercial aircraft take-offs and landings, with the seat back 22 secured in its fully upright position. In a high impact event, the seat back 22 will rotate forward while the panel 28 will be restrained from following the seat back 22 in forward rotation by the stops 29. The panel 28 is preferably detachably mounted to the seat back 22 with hook and loop fasteners, snap fasteners, or other appropriate fastening means. This allows the seat back 22 and panel 28 to separate. The panel initially remains upright to receive impact from the passenger's head. The panel 28 is preferably constructed of a low mass material so as to absorb some of the momentum of the passenger's head as it contacts the panel. The material could also be deformable or resilient, and is chosen for rigidity and energy absorption characteristics which result in the desired controlled deceleration of the head and reduction in HIC value. Preferred materials for the panel 28 include lightweight plastic.

While a seat assembly can be fabricated to include the "dummy seat back" panel, it will be readily appreciated that such a panel 28 can be separately constructed to be retrofitted to or installed on previously existing seat assemblies. In such a case, hook-and-loop fastener strips can be adhesively applied to the upholstery of a seat back to be coupled to corresponding fastener strips on the panel. Those with ordinary skill in the art will readily see alternative provisions for mounting the panel to a preexisting seat appropriate to its construction and upholstery.

While the invention has been described with reference to a preferred embodiment, it will be understood that modification in the construction, arrangement and operation of this preferred embodiment may be made without departing from the spirit and scope of the invention, the scope of which is defined by the following claims.

What is claimed is:

1. A seat for reducing head impact of a passenger seated behind said seat whose head is thrown forward by a sudden deceleration, comprising:

a seat frame;

a seat pan mounted on said frame;

a seat back mounted on said frame for pivotal movement toward said seat pan and generally away from said head of said passenger under a predetermined load imposed by the sudden deceleration;

a panel detachably fastened to the rearward surface of said seat back so as to break free of said seat back when said seat back pivots forward under said predetermined load; and stop means on said panel which restrain said panel from forward movement from an upright position where it lies in the path traveled by the head of said passenger.

2. The seat of claim 1 wherein said stop means comprise a block extending from said panel to abut said seat frame when said seat back is in an upright position.

3. A seat comprising:

a seat frame;

a seat pan mounted on said frame;

a seat back mounted on said frame for pivotal movement toward said seat pan under a predetermined load and for rearward pivotal movement to a reclining position;

a panel detachably fastened to the rearward surface of said seat back so as to break free of said seat back when said seat back pivots forward under said predetermined load and mounted to said seat back for rearward pivotal movement therewith; and stop means comprising a block extending from said panel to abut said seat frame when said seat back is in an upright position on said panel which restrain said panel from forward movement from an upright position.

4. The seat of claim 3 wherein said seat panel is fastened to said seat back with snap fasteners.

5. The seat of claim 3 wherein said panel comprises a deformable material.

6. The seat of claim 3 wherein said panel comprises resilient material.

7. The seat of claim 3 wherein said panel is fastened to said seat back with hook and loop fasteners.

\* \* \* \* \*